CONDUCTOR ARRANGEMENT FOR PROPAGATION OF SINGLE WALL DOMAINS IN MAGNETIC SHEETS

Filed June 7, 1967 2 Sheets-Sheet 1

INVENTORS A. H. BOBECK
R. F. FISCHER
BY Robert M. Shapiro
ATTORNEY

United States Patent Office 3,506,975
Patented Apr. 14, 1970

3,506,975

CONDUCTOR ARRANGEMENT FOR PROPAGATION OF SINGLE WALL DOMAINS IN MAGNETIC SHEETS

Andrew H. Bobeck, Chatham, and Robert F. Fischer, Livingston, N.J., assignors to Bell Telephone Laboratories, Incorporated, Murray Hill, N.J., a corporation of New York Filed June 7, 1967, Ser. No. 644,351
Int. Cl. G11c *11/14, 19/00*
U.S. Cl. 340—174 7 Claims

ABSTRACT OF THE DISCLOSURE

Magnetic memories comprising sheets of material in which single wall, reverse magnetized domains are advanced by consecutively offset propagation fields are potentially capable of packing densities determined by the size of the stable domain diameter. It has been found, however, that the domain diameter can be made smaller than can presently available compatible printed propagation drive circuitry which provides the propagation fields when pulsed. The latter, then, becomes the limiting factor in packing densities. The disclosure describes an improved propagation drive configuration which permits, inter alia, fuller realization of the packing density capabilities.

FIELD OF THE INVENTION

This invention relates to magnetic sheet memories, particularly those comprising magnetic materials characterized by preferred directions of magnetization substantially normal to the plane of the sheet of the material and capable of supporting stable, single wall, reverse magnetized domains.

BACKGROUND OF THE INVENTION

Copending patent application Ser. No. 579,931, filed Sept. 16, 1966 for A. H. Bobeck, U. F. Gianola, R. C. Sherwood, and W. Shockley discloses a two-dimensional shift register arrangement comprising, illustratively, a sheet of orthoferrite material in which the preferred direction for flux orientation is substantially normal to the plane of the sheet of material. Information is stored in such a sheet as reverse magnetized domains each enclosed by a single domain wall. Copending application Ser. No. 579,905, of A. H. Bobeck, also filed Sept. 16, 1966, describes a memory organization in which a single wall domain is moved to information indicative positions in each bit location in a domain wall memory.

In the context of either the shift register or the memory arrangement, the movement of a single wall domain is in response to propagation fields generated sequentially in consecutively offset positions to, in effect, provide consecutive potential wells into which the domain falls. Movement of a domain in a desired direction is controlled by operating the propagation field generating means in a multiphase fashion in accordance with the well understood considerations. The propagation means in the shift register context, for example, comprises three interleaved conductors each forming conducting loops at positions on the sheet of material spaced apart two positions from one another. A pulse on a conductor coupled to a position next adjacent an existing reverse domain, then, generates an appropriate field in only one of two positions next adjacent the domain and movement in the desired direction is realized. In the memory context, movement of a domain between "0" and "1" positions spaced apart two positions in a selected location is effected similarly in response to consecutive pulses on X and Y oriented propagation conductors. Again each conductor includes conducting loops for generating appropriate consecutive propagation fields when pulsed.

The packing densities of, for example, the memory arrangements, are determined, primarily, by the diameter of the reverse domain, the number of possible positions for a domain in each bit location, and the area occupied by the conducting loop. It has been found that domains may have diameters of significantly less than one mil. In the memory organization disclosed in the aforementioned copending application of A. H. Bobeck, four possible positions (0 and 1 positions spaced apart two positions) for a reverse domain are provided in each bit location leading to a requirement of about ten square mils allocated per bit for one mil domains allowing for one mil spacings between bit locations. Printed circuitry, however, has a readily realizable line width of about one-half mil and a conducting loop defines, for example, a one mil opening. Four such loops require at least forty square mils to accommodate the drive circuitry allowing for corresponding spacings between bit locations. Even with domains having micron diameters, bit packing densities cannot be increased significantly without a corresponding improvement in the printed circuitry technology.

The loop-shaped propagation circuitry insures that domain size remains substantially constant during a propagation operation. It has been found, however, that highly stable (diameter) domains are provided by properly dimensioned material depending on domain wall energy and magnetostatic considerations which are well understood functions of materials and the sheet geometry. Consequently, propagation circuitry need not include conducting loops.

SUMMARY OF THE INVENTION

In accordance with an embodiment of this invention, each printed propagation conductor is in the form of interconnected straight line segments having alternately positive and negative slopes to insure registration of consecutive positions for a domain when consecutive propagation conductors are pulsed. Currents applied to conductors of this form generate suitable propagation fields to propagate a domain from its position with respect to a positive slope in one conductor to a corresponding position with respect to a positive slope in the next adjacent conductor. Several such conductors are employed in slightly spaced apart positions and operated in a multiphase fashion to enable control over the direction of propagation. Although overlapping of "loop-shaped" propagation conductors permits some reduction in bit size and a concomitant increase in bit capacity over that indicated above, the present arrangement enables a further reduction of about an order of magnitude in the area allocated for each bit location. Not only is bit capacity increased, in accordance with this invention, but also correspondingly smaller-diameter domains are employed in a significantly lower propagation field and thus drive current enabled. Bit capacities of as much as $10^6$ per square inch are possible with domain diameters of one-half mil and drive currents of less than fifty milliamperes are suitable. Moreover, higher operating speeds are permitted because domains need to be moved only relatively short distances.

DETAILED DESCRIPTION

Figure 1:
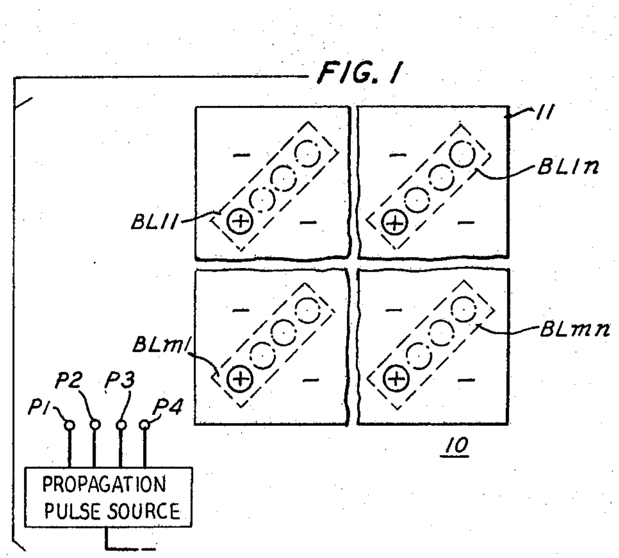
FIG. 1 is a schematic illustration of a memory arrangement in accordance with this invention.

FIG. 1 shows an illustrative magnetic memory arrangement 10 including a magnetic sheet 11 with a preferred direction of flux orientation substantially normal to the plane of the sheet. The sheet includes a plurality of bit locations each of which includes four circles representing four possible positions for a single wall reverse magnetized domain. Sheet 11 is normally in a uniform magnetization condition with flux directed away from the reader as indicated by the minus signs. A reverse magnetized domain, then, is represented by an encircled plus sign indicating a localized area where flux is directed toward the reader. Only four representative bit locations BL11, BL1*n*, BL*m*1, and BL*mn* are shown.

The circles in each bit location are referred to as first, second, third, and fourth consecutive positions for convenience. The reverse magnetized domain is shown occupying the first position in each bit location. Information is stored selectively by moving a reverse domain from a first position in a selected bit location to the fourth position there. A domain in the first position may be thought of as representing a binary zero; a domain in the fourth position may be thought of as representing a binary one. The presence and absence of a reverse domain in a fourth position also may be thought of as representing a binary one and a binary zero respectively.

A single wall domain is moved in a selected bit location by a pulse program applied to a plurality of propagation conductors coupled to each bit location as is described in the aforementioned application of A. H. Bobeck. To this end, the propagation conductors are organized conveniently along orthogonal axes. The propagation conductors are omitted from FIG. 1 for clarity; but in accordance with this invention take a form as discussed hereinafter in connection with FIGS. 2, 3, and 4. We are interested primarily with the shape of the propagation conductors. The organization of those conductors and the operation thereof are described in the aforementioned application of A. H. Bobeck. The provision of single wall domains in sheet 11, initially, is disclosed in the aforementioned application of Bobeck et al.

Figure 2:
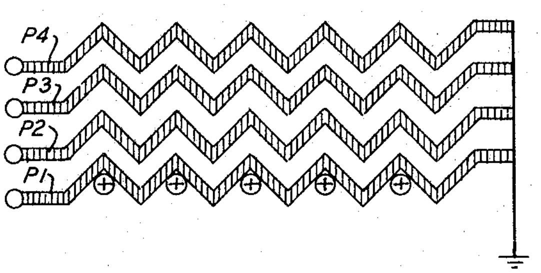
FIGS. 2, 3, 4, 5 and 6 are schematic illustrations of alternative portions of the arrangement of FIG. 1 showing propagation wiring and field configurations for domain propagation.
Figure 3:
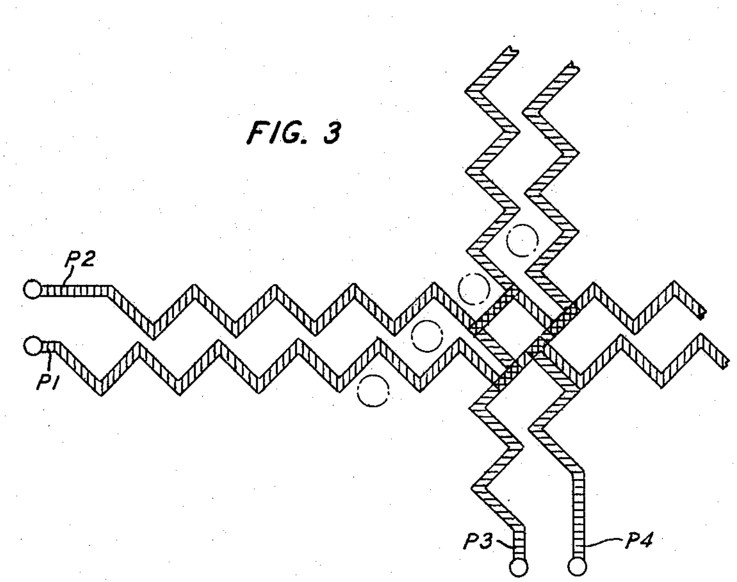

In accordance with this invention, propagation conductors are of a form to provide a nonuniform repetitive magnetic field thereabout when pulsed. FIG. 2 shows a plurality of such conductors designated P1, P2, P3, and P4 and arranged, conveniently, in an overlapping fashion. Each conductor is in the form of interconnected line segments having alternately positive and negative slopes. In the memory arrangement described in the abovementioned copending application of A. H. Bobeck, the P1 and P2 conductors are connected to an X propagation pulse source while the P3 and P4 conductors are connected to a Y propagation pulse. This organization is indicated in FIG. 3 where the propagation conductors P1 and P2 and the conductors P3 and P4 are shown oriented at angles. Conveniently, the conductors connected to X and to Y sources are in first and second layers of printed circuitry, respectively, oriented at ninety degrees with respect to one another. In FIG. 1 the conductors are indicated to be connected between a block, representing the propagation pulse sources, and ground.

Figure 4:
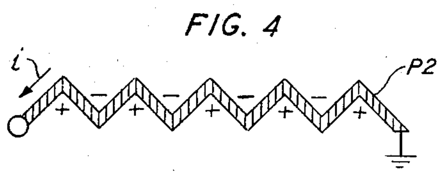

FIG. 4 shows a single conductor P2 of FIG. 2 or FIG. 4. In response to a current pulse in such a conductor in the direction indicated by the arrow *i* in FIG. 4, a field pattern represented by the plus and minus signs in FIG. 4 is generated. The plus and minus signs indicate fields directed toward and away from the reader, respectively, and may be seen to be compatible with flux directions in sheet 11 as described in connection with FIG. 1. A domain represented by an encircled plus sign in FIG. 2 then is propagated to a corresponding position with respect to next adjacent conductor P3 when that conductor is pulsed. It is clear then that such a domain is propagated to next consecutive positions with respect to each of those conductors as that next consecutive conductor is similarly pulsed in sequence.

Next adjacent conductors are pulsed consecutively in order to provide consecutive displacement of a domain in a selected direction. By placing next adjacent conductors so that positions of correspondingly high propagation fields are (in registry) arranged in the direction of desired movement, domain displacement is controlled. For example, FIG. 2 shows high intensity positive field positions, indicated by the plus signs, generated by consecutively pulsed conductors organized along a vertical orientation in the plane of the drawing. FIG. 3, on the other hand, shows those high intensity field positions oriented along a diagonal for the operation of the memory shown in FIG. 1.

Figure 5:
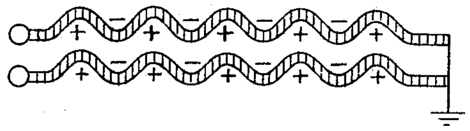
Figure 6:
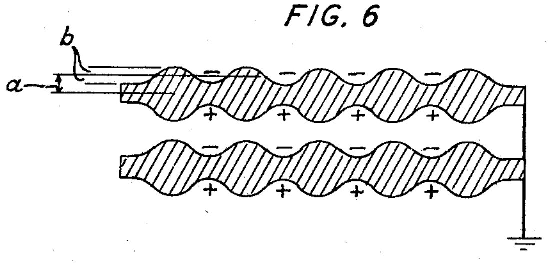

FIG 4 shows a propagation conductor having sharp changes in slope leading to correspondingly high field intensities. FIGS. 5 and 6 show alternative conductor geometries wherein the changes are more gradual. In FIG. 5, the conductor may be seen to follow a sinusoidal path or wave. In FIG. 6, each side of the conductor varies sinusoidally providing a conductor having a width varying as does $a+b \sin \theta$ where $b$ is the amplitude and $a$ is the displacement as indicated in the figure. Of course $a>b$ in order to have a continuous conductor. Appropriate fields are provided with each of these geometries. The propagation conductor need only follow a path or be of a shape to provide repetitive positive fields when pulsed such that a single wall domain advances to corresponding positions along consecutive conductors as each conductor is pulsed.

One-half mil (width) conductors of the type shown in FIGS. 2, 3, and 4 permit an area of less than five square mils allocated per bit location in an organization of the type shown in FIG. 1. One-half mil diameter domains may be moved in such an arrangement by currents of about 50 milliamperes and at voltage levels of about 10 volts. Bit packing densities of more than $10^5$ bits per square inch are achieved. Such a memory operates in the megacycle range and is read out optically via the Kerr or Faraday effects or electrically.

It is possible, of course, to move domains of different diameters with wiring patterns in accordance with this invention. The diameters of the domains, however, are such as to be effected at one time by only one high positive field generated by a pulse in a selected propagation conductor. For example, for one-half mil (width) conductors spaced one mil apart and having a repetitive geometry on three mil centers, domains of from one micron to one mil may be moved.

What has been described is considered only illustrative of the principles of this invention. Accordingly, various and other arrangements may be devised by one skilled in the art without departing from the spirit and scope of this invention.

What is claimed is:

1. A magnetic memory including a sheet of magnetic material characterized by a preferred direction of magnetization out of the plane of the sheet and capable of having single wall domains propagated therein in response to consecutively offset propagation fields, said memory also including a propagation means comprising a plurality of elongated propagation conductors each coupled to a different portion of said sheet for generating said propagation fields when pulsed, each of said conductors being of a uniform width and following the form of a wave having alternating positive and negative slopes.

2. A magnetic memory in accordance with claim 1 wherein said preferred direction is substantially normal to the plane of said sheet.

3. A magnetic memory in accordance with claim 2 wherein the width of said conductors varies in a repetitive fashion.

4. A magnetic memory in accordance with claim 3 wherein the width of the conductor varies as $a+b \sin \theta$ where $a>b$.

5. A magnetic memory in accordance with claim 1 wherein next adjacent ones of said conductors overlap such that positive and negative slope portions of next adjacent conductors are in registry with one another.

6. A magnetic memory in accordance with claim 5 wherein said positive and negative slopes are constant.

7. A magnetic memory in accordance with claim 5 wherein said wave is a sine wave.

References Cited

UNITED STATES PATENTS 3,427,603 2/1969 Wolf et al. ---------- 340—174

BERNARD KONICK, Primary Examiner

G. M. HOFFMAN, Assistant Examiner